US008339903B2

(12) United States Patent
Olmes

(10) Patent No.: US 8,339,903 B2
(45) **Date of Patent: *Dec. 25, 2012**

(54) DUAL ILLUMINATION WATCH FACE, AND ASSOCIATED METHODS

(76) Inventor: James Brewster Olmes, Agoura Hills, CA (US)

( * ) Notice: Subject to any disclaimer, the term of this patent is extended or adjusted under 35 U.S.C. 154(b) by 23 days.

This patent is subject to a terminal disclaimer.

(21) Appl. No.: 13/042,339

(22) Filed: Mar. 7, 2011

(65) Prior Publication Data

US 2011/0158056 A1 Jun. 30, 2011

Related U.S. Application Data

(63) Continuation of application No. 12/211,738, filed on Sep. 16, 2008, now Pat. No. 7,903,503.

(60) Provisional application No. 60/977,046, filed on Oct. 2, 2007.

(51) Int. Cl.

| | |
|---|---|
| ***G04B 19/32*** | (2006.01) |
| ***G04B 19/30*** | (2006.01) |
| ***G04B 19/04*** | (2006.01) |
| ***G01D 11/28*** | (2006.01) |
| ***H02M 3/335*** | (2006.01) |

(52) U.S. Cl. ........ 368/226; 368/227; 368/228; 116/286; 250/463.1; 362/23

(58) Field of Classification Search .................... 368/67, 368/223, 226–228, 232, 238; 116/286–288; 257/98–100; 313/483, 485, 487; 362/29, 362/34, 84, 23

See application file for complete search history.

(56) References Cited

U.S. PATENT DOCUMENTS

| | | | |
|---|---|---|---|
| 78,972 | A | 6/1868 | King |
| 1,342,676 | A | 6/1920 | Hollings |
| 1,414,628 | A | 5/1922 | Cuntz |
| 2,360,516 | A | 10/1944 | Schmidling |
| 3,131,670 | A | 5/1964 | Hardesty |
| 3,431,721 | A | 3/1969 | Slaugh |
| 3,701,900 | A | 10/1972 | Thuler |
| 3,724,202 | A | 4/1973 | Feller |
| 3,787,684 | A | 1/1974 | Isenberg |
| 4,205,522 | A | 6/1980 | Takami |
| 4,245,282 | A | 1/1981 | Sokol |
| 4,285,029 | A | 8/1981 | McCoy |
| 4,468,134 | A | 8/1984 | Halicho |
| 4,546,417 | A | 10/1985 | Watts |
| 5,270,100 | A | 12/1993 | Giglio |
| 5,604,716 | A | 2/1997 | Cheung |

(Continued)

FOREIGN PATENT DOCUMENTS

CH 606665 12/1967

(Continued)

OTHER PUBLICATIONS

Internet advertisement (http://www.gemday.com/item0506.htm) Smith & Wesson 93T Diplomat Titanium Chronograph with Tritium Illumination, SWW-93T-BLU, SWW-93T-YLW, SWW-93T-GRY; Oct. 21, 2007; 6 pages.

(Continued)

*Primary Examiner* — Vit W Miska

(74) *Attorney, Agent, or Firm* — Lathrop & Gage LLP

(57) ABSTRACT

Systems and methods for a dual illumination watch face having a tritium gas tube coupled with a dial, minute hand or hour hand of the watch face, and phosphorescent material disposed with at least one of the dial, minute hand and hour hand.

13 Claims, 10 Drawing Sheets

U.S. PATENT DOCUMENTS

| | | | |
|---|---|---|---|
| 6,158,868 | A | 12/2000 | Chien |
| 6,294,800 | B1 | 9/2001 | Duggal et al. |
| 6,806,644 | B2 | 10/2004 | Ueno et al. |
| 2004/0105345 | A1 | 6/2004 | Kouch |
| 2004/0196742 | A1 | 10/2004 | Gouthier et al. |
| 2008/0013409 | A1 | 1/2008 | Bland et al. |

FOREIGN PATENT DOCUMENTS

| | | |
|---|---|---|
| CN | 2664031 | 12/2004 |
| CN | 2664032 | 12/2004 |
| FR | 1458159 | 3/1966 |

OTHER PUBLICATIONS http://www.sripperybrick.com/2006/07/reactor-trident-watch/, "Reactor Trident", Jun. 14, 2007.

http://www.watcharama.com/m16.htm ; "Watcharama", Oct. 10, 2004.

http://www.candlepowerforums.com/vb/showthread.php?t=119895; "New Tritium Idea", Jun. 6, 2006.

http://edscorner1.blogspot.com/2006/07/uzi-protector-tritium-watch-review.html; "Ed's Corner", Jul. 17, 2006.

http://home.earthlink.neV-brendo81/1nfoPagesIW46374E.html ; "Mil-W-4637E", Aug. 11, 2003.

http:www.time4tritium.com/item.cfm?id=::61 ; "Smith & Wesson SWW-450-Blue", Aug. 13, 2006.

http://www.ohgizmo.com/2007/07/25/reactor-trident-watch-with-never-dark-illumination/ ; "Oh! Gizmo", Jul. 25, 2007.

PCTIUS2008/078615 International Search Report & Written Opinion mailed Mar. 17, 2009, 14 pages.

U.S. Appl. No. 12/211,738 Selected pages dated Jun. 29, 2009 through Feb. 7, 2011, 178 pages.

DUAL ILLUMINATION WATCH FACE, AND ASSOCIATED METHODS

RELATED APPLICATIONS

This application is a Continuation of application Ser. No. 12/211,738, filed Sep. 16, 2008 now U.S. Pat. No. 7,903,503, which claims priority to U.S. Provisional Patent Application No. 60/977,046, filed Oct. 2, 2007. Both of the aforementioned applications are incorporated herein by reference.

BACKGROUND

For many of those who wear watches, being able to read them in the dark is a major factor in deciding which watch to buy. The majority of watches made do not glow in the dark; of those that do, the length of time and brightness of the glow is dependent on the technology employed by the watchmaker. An alternate technology uses battery power to illuminate the watch dial when a button is pushed. However, since each use takes power from the battery, battery life is reduced.

Today's glow-in-the-dark watches use two basic means to achieve luminosity: a) the application of a phosphorescent material, such as Super-LumiNova® to the hands, dial and indices; and b) the use of tritium gas tubes. The use of phosphorescent material is the more popular method of providing luminescence, although there are pros and cons to both technologies.

Phosphorescent material works like a "light battery" that has to be "charged" before it outputs light energy. When you charge the phosphorescent material by light (sunlight or artificial light), the material's electrons are lifted to a higher quantum level. The stronger the activation light and the longer the exposure, the more electrons are lifted. In the dark, these lifted electrons return to previous energy levels, releasing energy in the form of light. Viewed in the dark, the luminosity of phosphorescent material is brightest at the beginning and then dies down until it eventually loses all its visible brightness.

In watches that use tritium (officially, gaseous tritium light source or GTLS), glass tubes holding tritium gas are placed within the watch. These tubes are made of borosilicate glass, which is temperature resistant. A coating of phosphorous material is applied to the inside of the tubes, which are then evacuated, filled with tritium gas and sealed. The level of brightness of these tubes is determined by the pressure of tritium in the tube, which is determined by the amount of tritium gas present (from 0 to 2.5 bar of gas). Although tritium has a half-life of twelve and a half years, a tritium gas tube is considered to have an operational luminosity between four to six years before its output level drops to below 50% of its original output level. When viewed in the dark, the luminosity of a tritium gas tube is lower than the initial luminosity of the phosphorous material, but remains constant over a larger period.

Each method of luminescence is selected based upon need. Tritium is used in areas where it's imperative that a timepiece be visible in total darkness, regardless of the availability of a light source. Phosphorescent material is used for all other applications, where luminescence is required only for a short period of time within a dark environment.

SUMMARY

In an embodiment, a dual illumination watch face includes a tritium gas tube coupled with at least one of a dial, minute hand or hour hand of the watch face, and phosphorescent material disposed with at least one of the dial, minute hand and hour hand.

In another embodiment, a dual illumination watch face has a tritium gas tube coupled with a dial, minute hand or hour hand of the watch face, and phosphorescent material disposed with an exterior surface of the tritium gas tube such that light emitted by the tritium gas tube is visible through one or more windows formed by the phosphorescent material.

In another embodiment, a method for manufacturing a dial for a dual illumination watch face includes forming a dial with one or more cutouts for tritium gas tubes, the width of each cutout smaller than a maximum width of the associated tritium gas tube. One or both of a color and a texture is applied to the dial. Phosphorescent material is applied to the dial and the associated tritium gas tube is inserted into the front of each cutout. The tritium gas tube is affixed in place from the rear of the dial.

DETAILED DESCRIPTION OF THE FIGURES

Figure 1:
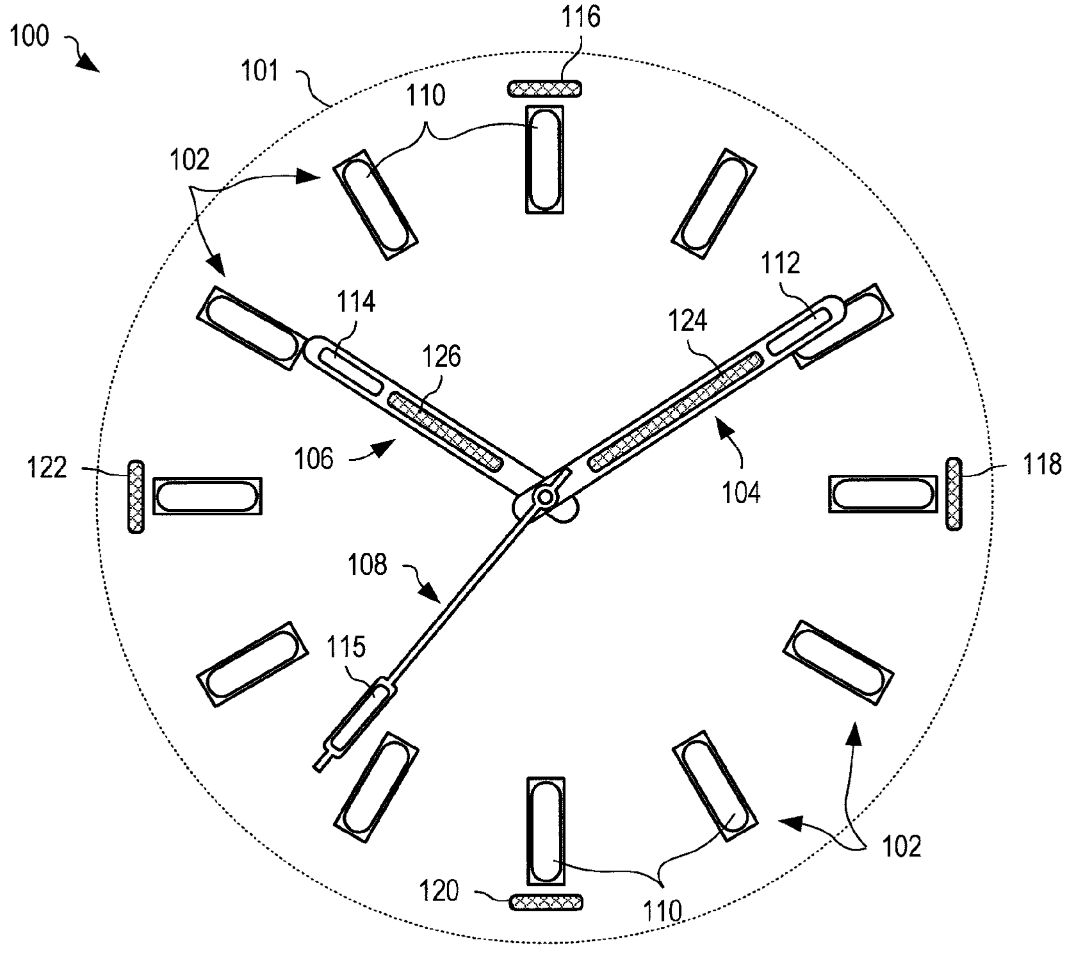
FIG. 1 shows one exemplary dual illumination watch face with tritium gas tubes and phosphorescent material.

FIG. 1 shows one dual illumination watch face 100. Dual illumination watch face 100 is formed of a dial 101 with twelve hour markings 102, a minute hand 104, an hour hand 106 and a second hand 108. Dial 101 may be pressed out of a copper sheet or other material. Each hour marking 102 has a coating of phosphorescent material 110 such that it glows when moved from a light environment to a dark environment. In one embodiment, phosphorescent material 110 is Super- LumiNova®. Dial 101 also has four tritium gas tubes 116, 118, 120 and 122 that are positioned adjacent each of the twelve, three, six and nine markings 102, respectively. Minute hand 104 has a coating of phosphorescent material 112 at one end and a tritium gas tube 124 positioned along a mid-portion of minute hand 104, such as shown. Hour hand 106 has a coating of phosphorescent material 114 at one end and a tritium gas tube 126 positioned along a mid-portion of hour hand 106, such as shown. Second hand 108 has a coating of phosphorescent material 115 at one end. Phosphorescent material 110, 112, 114 and 115 is applied to a thickness of between 0.2 and 0.25 mm, although thicker and thinner layers may be made without departing from the scope hereof.

Tritium gas tubes 116, 118, 120, 122, 124 and 126 continuously generate low-level light over their operational life, without requiring exposure to light. In darkness (and after exposure to light), areas coated with phosphorescent material, i.e., phosphorescent material 110, 112, 114 and 115, emit light that is brighter than the light emitted by tritium gas tubes 116, 118, 120, 122, 124 and 126; however, the intensity of light emitted by phosphorescent material 110, 112, 114 and 115 reduces with time.

Figure 2:
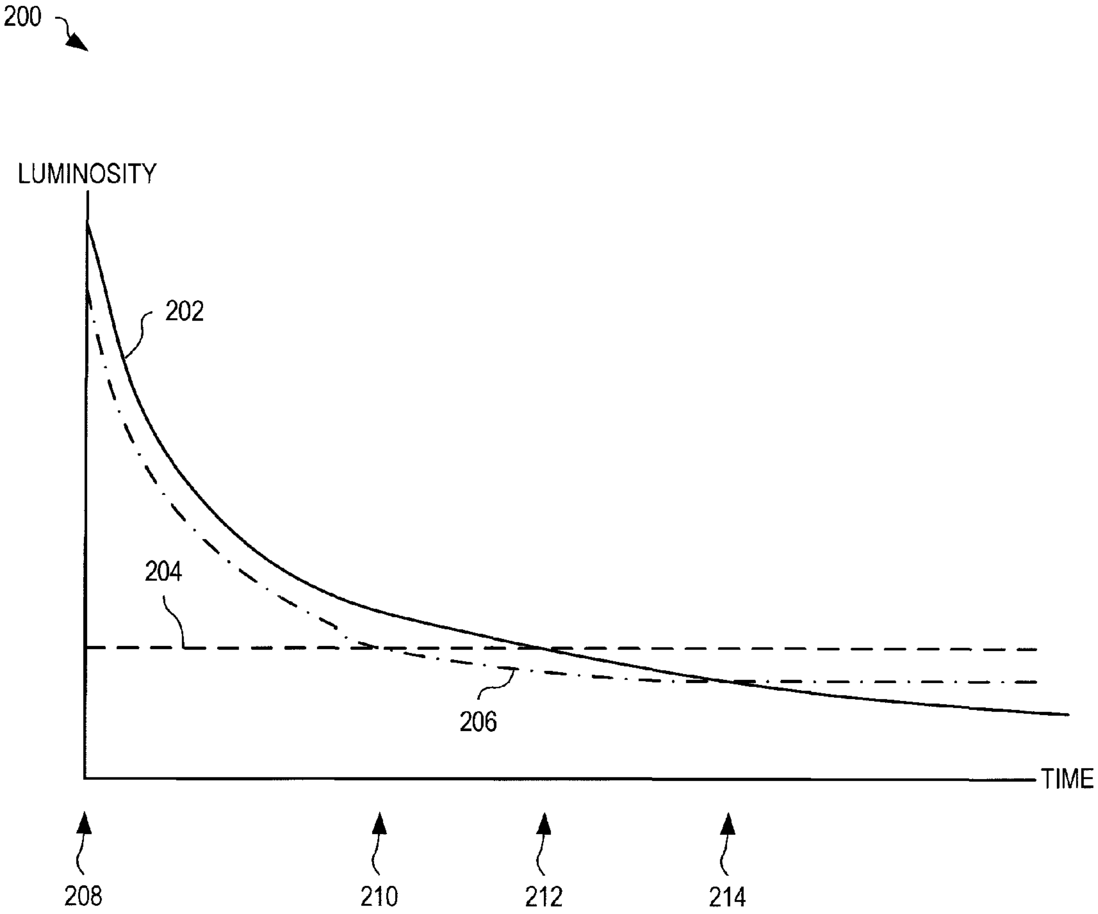
FIG. 2 shows a graph of luminosity plotted against time for light emitted by tritium gas tubes and the phosphorescent material of the watch face of FIG. 1 after transitioning from a light to a dark environment.

In particular, FIG. 2 shows a graph 200 of luminosity plotted against time for light emitted by tritium gas tubes 116, 118, 120, 122, 124 and 126, shown as line 204, and phosphorescent material 110, 112, 114 and 115, shown as line 202, of dual illumination watch face 100 (FIG. 1) when placed in a dark environment and after exposure to a light source. Line 206 illustrates how a human eye adapts after transitioning from a light environment to a dark environment. Over time, sensitivity of the human eye increases enabling it to sense lower levels of light until a maximum sensitivity is reached, as shown by line 206.

Illustratively, at an initial time 208, dual illumination watch face 100 and a human eye transition from a light environment to the dark environment. As shown by line 202, the phosphorescent material has a high initial luminosity above the sensitivity threshold of the human eye shown in line 206. However, over time, the luminosity of the phosphorescent material decreases until it drops below the sensitivity level of the human eye at time 214.

Line 204 of graph 200 shows a constant luminosity level of tritium gas tubes 116, 118, 120, 122, 124 and 126. Since the sensitivity threshold of the human eye is initially higher than the light output from the tritium gas tubes, these tubes are not initially visible to the human eye. However, as the human eye adapts to the dark environment, its sensitivity level increases, and at time 210 the tritium gas tubes become visible and remain visible to the human eye after time 214 (whereinafter the phosphorescent material loses visibility). At a certain time 212, the phosphorescent material and the tritium gas tubes have an equal luminosity, as shown.

Thus, the use of tritium gas tubes 116, 118, 120, 122, 124 and 126 and phosphorescent material 110, 112, 114 and 115 results in a highly visible dual illumination watch face 100 when transitioning from a light environment to a dark environment. Tritium gas tubes 116, 118, 120, 122, 124 and 126 are for example formed by suspending a phosphorescent material in alcohol and forcing the solution inside the tubes. The phosphorescent material adheres to the insides of the tubes. The alcohol is drained from the tubes, and the tubes are dried. Tritium gas is introduced into the tubes and sealed therein. The phosphorescent material within Tritium gas tubes 116, 118, 120, 122, 124 and 126 is not numerically referenced herein. Phosphorescent material that is numerically referenced herein is applied to watch parts (e.g., hands or hour markings, see phosphorescent material 110, 112, 114, 115) or to exterior surfaces of Tritium gas tubes already manufactured with internal phosphorescent material and Tritium gas.

Figure 3:
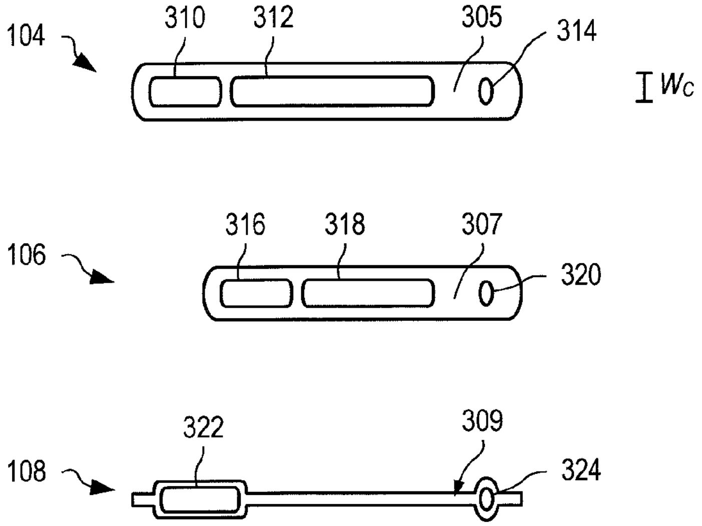
FIG. 3 illustrates construction of minute, hour and second hands of the dual illumination watch face of FIG. 1.
Figure 11:
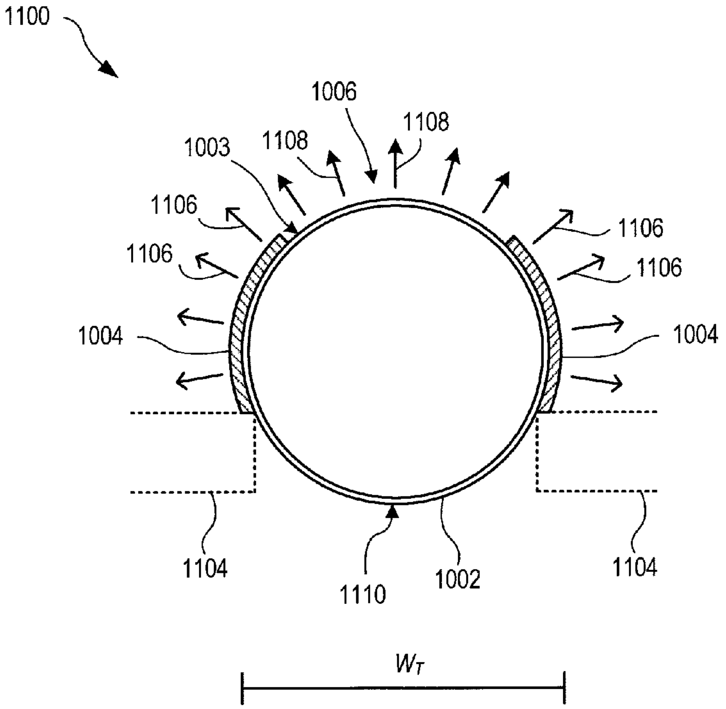
FIG. 11 shows a cross-section through the tritium gas tube and phosphorescent material of FIG. 10.

FIG. 3 illustrates construction of minute hand 104, hour hand 106 and second hand 108 of dual illumination watch face 100, FIG. 1. Minute hand 104 is formed with a cutout 310 for phosphorescent material 112, a cutout 312 for mounting tritium gas tube 124, and a cutout 314 for mounting hand 104 to watch face 100. The width $w_C$ of cutout 312 is slightly smaller than a maximum width of tritium gas tube 124 (e.g., maximum tube width $w_T$, which may also be the diameter of the tritium gas tube, as shown in FIG. 11), such that when inserted into cutout 312 from the front, two-thirds of tritium gas tube 124 remains above minute hand 104, for example. A surface 305 of hand 104 may be coated in a colored and/or metallic material. Phosphorescent material 112 is then applied to the reverse (i.e., non visible) side of cutout 310. See, e.g., FIG. 4, described below. Viscosity of phosphorescent material 112 causes cutout 310 to be filled and yet keeps material 112 from dripping out of cutout 310. Multiple coats of phosphorescent material 112 may be applied until a desired thickness is reached, each coat being cured before application of the next. Thus, luminosity of phosphorescent material 112 shows through cutout 310. After phosphorescent material 112 has cured, tritium gas tube 124 is inserted into the front side of cutout 312 and then fixed in place via the reverse side of cutout 312, for example by use of adhesive tape. See FIG. 4.

Similarly, hour hand 106 is formed with a cutout 316 for phosphorescent material 114, a cutout 318 for mounting tritium gas tube 126, and a cutout 320 for mounting hand 106 to dual illumination watch face 100. Cutout 318 is slightly smaller than tritium gas tube 126, such that when inserted into cutout 318 from the front, about two-thirds of tritium gas tube 126 remains above hour hand 106. For example, the width of cutout 318 (not shown, see, e.g., width $w_C$ of cutout 312) is less than a maximum tube width (e.g., width $w_T$, shown with respect to tube 1002 in FIG. 11) of tritium gas tube 126. It will be appreciated that the maximum width of tritium gas tube 126 may be the diameter of gas tube 126. A surface 307 of hand 106 may be coated in a colored and/or metallic material. A phosphorescent material 114 is then applied to a reverse (i.e., non-visible) side of cutout 316. Viscosity of phosphorescent material 114 causes cutout 316 to be filled and yet keeps material 114 from dripping out of the cutout prior to curing. Multiple coats of phosphorescent material 114 may be applied until a desired thickness is reached, each coat being cured before application of the next. Thus, luminosity of phosphorescent material 114 shows through cutout 316. After phosphorescent material 114 has cured, tritium gas tube 126 is inserted into the front side of cutout 318 and then fixed in place via the reverse side of cutout 318, for example by use of adhesive tape.

Similarly, second hand 108 is formed with a cutout 322 for phosphorescent material 115 and a cutout 324 for mounting hand 108 to dual illumination watch face 100. A surface 309 of hand 108, excluding cutout 322, may be coated in a colored and/or metallic material. A phosphorescent material 115 is then applied to a reverse (i.e., non-visible) side of cutout 322. Viscosity of phosphorescent material 115 causes cutout 322 to be filled and yet keeps material 115 from dripping out of the cutout before curing. Multiple coats of phosphorescent material 115 may be applied until a desired thickness is reached, each coat being cured before application of the next. Thus, luminosity of phosphorescent material 115 shows through cutout 322.

Figure 4:
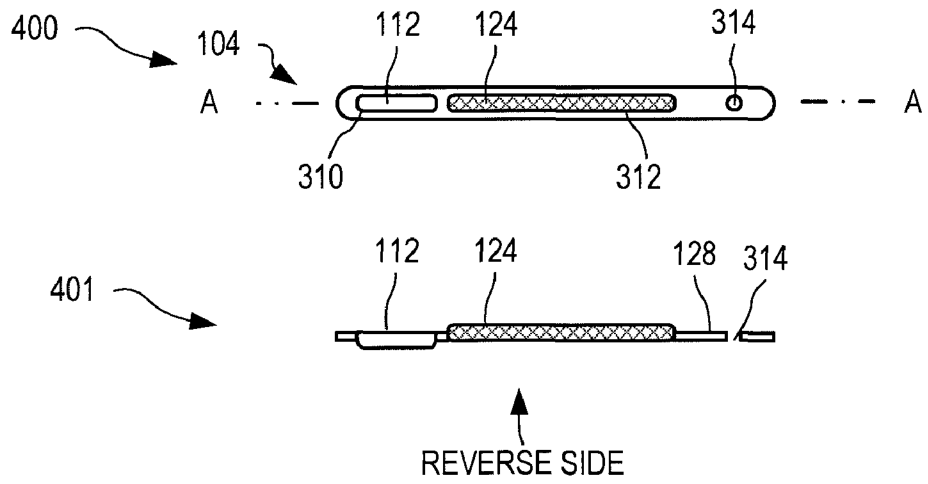
FIG. 4 shows a top view and a cross-section through the minute hand of the dual illumination watch face of FIG. 1, in an embodiment.

FIG. 4 shows a top view 400 and a cross section 401 (at line A-A of top view 400) through minute hand 104, FIG. 1. Cross section 401 shows tritium gas tube 124 inserted into a front side 128 of cutout 312 of minute hand 104 and phosphorescent material 112 applied to a reverse side of cutout 310. It will be appreciated that hour hand 106 may also be fitted with tritium gas tube 126 and treated with phosphorescent material 114, in the manner depicted with respect to minute hand 104 in FIG. 4. Likewise, second hand 108 may be treated with phosphorescent material 115 in the same manner in which minute hand 104 is shown treated with phosphorescent material 112.

Figure 5:
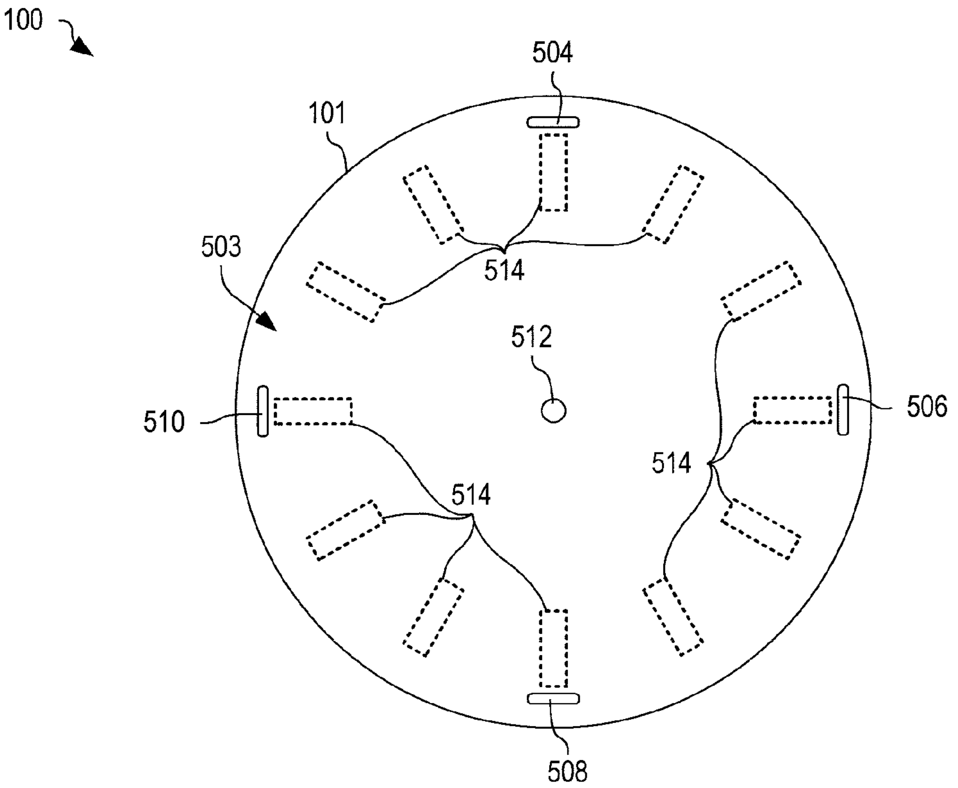
FIG. 5 illustrates construction of the dial of the dual illumination watch face of FIG. 1.

FIG. 5 shows construction of dial 101 of dual illumination watch face 100, FIG. 1. Dial 101 may be made of brass or copper and may be formed by one or more of stamping, etching and engraving. Dial 101 has four cutouts 504, 506, 508 and 510, corresponding to locations of tritium gas tubes 116, 118, 120 and 122. The width of each cutout is slightly smaller than the maximum width (see width $w_T$, FIG. 11) of the associated tritium gas tubes 116, 118, 120 and 122, such that about two-thirds of each tritium gas tube remains above dial 101 when inserted into cutouts 504, 506, 508 and 510 from the front. Areas 514 of a surface 503 of dial 101 are coated with a white material (e.g., white paint) and remaining surface 503 (i.e., excluding areas 514) may then be coated with a colored and/or metallic material. Phosphorescent material 110 may then be applied to areas 514, over the white material, to provide additional luminosity to areas 514. Multiple coatings of phosphorescent material 110 may be applied to areas 514, curing each coating before application of the next, to achieve a desired thickness of phosphorescent material 110.

Tritium gas tubes 116, 118, 120 and 122 are then inserted into the front sides of cutouts 504, 506, 508 and 510 and fixed in place from the reverse side of cutouts 504, 506, 508 and 510, respectively. In one example, a 3M tape is used to secure tubes 116, 118, 120 and 122 to dial 101 by its application to the rear of dial 101. In one embodiment, tritium gas tube 116 emits a different color light from tritium gas tubes 118, 120 and 122, thereby allowing the user to determine orientation of dual illumination watch face 100 even when the watch is not being worn. For example, tube 116 may emit an orange light and tubes 118, 120 and 122 may emit a green light; other color combinations are within the scope of this disclosure.

In an embodiment, each of areas 514 are formed as numbers 1-12 in a large and easily readable font. Thus, individual numerical positions on dial 101 are discernable in light or dark conditions.

This manufacturing process may be performed in two stages, such as in the following description. For example, dial 101 is first stamped with cutouts 504-512 and any coloring and/or texturing is applied to the front of the dial. The white material is then applied to areas 514 using a process of masking and spraying, and cured. One or more coatings of phosphorescent material 110 are then applied to areas 514 on top of the cured white material. Tritium gas tubes 116, 118, 120 and 122 are then inserted into the front sides of cutouts 504, 506, 508 and 510, and affixed in place using 3M tape on the rear of dial 101. Hands 104-108 are created with cutouts 310, 312, 314, 316, 318, 320, 322 and 324 and then colored and/or textured. For example, these hands are stamped out of a sheet of copper or other material and painted with a desired finish. Cutouts 310, 316 and 322 are then coated, from the rear, with phosphorescent materials 112, 114 and 115, respectively. Multiple coats of phosphorescent materials 112, 114 and 115 may be applied. Tritium gas tubes 124 and 126 are then inserted into cutouts 312 and 318 from the front and affixed from the rear using tape, for example.

Dial 101 and hands 104, 106 and 108 are then assembled to form dual illumination watch face 100 using an appropriate movement (the controller or mechanism to drive hands 104, 106 and 108). Although tritium gas tubes are shown on minute hand 104, hour hand 106 and dial 101 of watch face 100, more or fewer tritium gas tubes may be used without departing from the scope hereof. For example, where a high torque movement is employed, a tritium gas tube may also be fitted to second hand 108.

Figure 6:
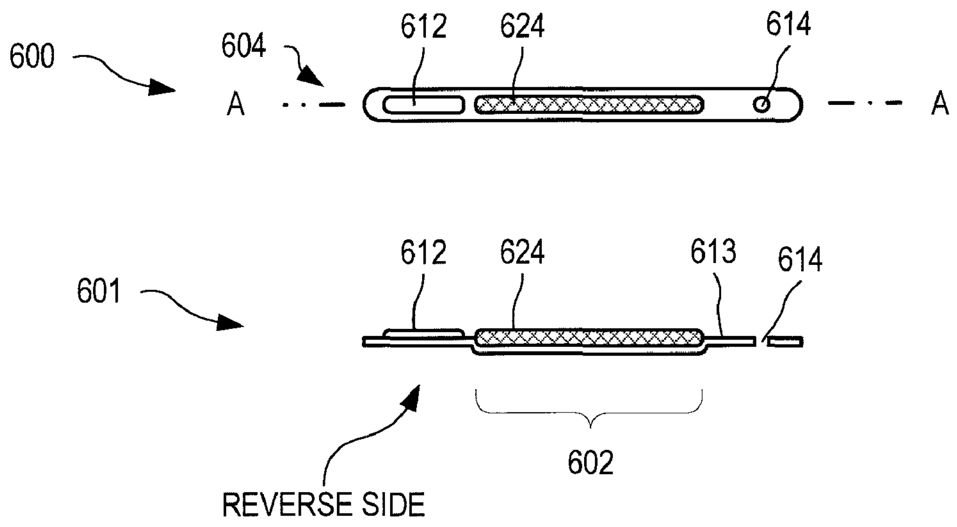
FIG. 6 shows a top view and a cross section through an alternate construction of the minute hand of the dual illumination watch face of FIG. 1, in accord with an embodiment.

FIG. 6 shows a top view 600 and a cross section 601 (taken at line A-A of view 600) though a minute hand 604, illustrating an alternate embodiment of minute hand 104, FIG. 1. For example, where dual illumination watch face 100 is larger and operated by a heavy duty (higher torque) movement, weight and balance of hands is less critical and alternate construction methods may be used. In this example, phosphorescent material 612 is formed on a front side 613 of hand 604 and not within a cutout, and tritium gas tube 624 is fixed within a depression 602 formed with front side 613 of hand 604, such that tube 624 is securely fixed in place. Cutout 614 represents cutout 314 of minute hand 104 and is used to mount minute hand 604 to an appropriate movement.

Figure 7:
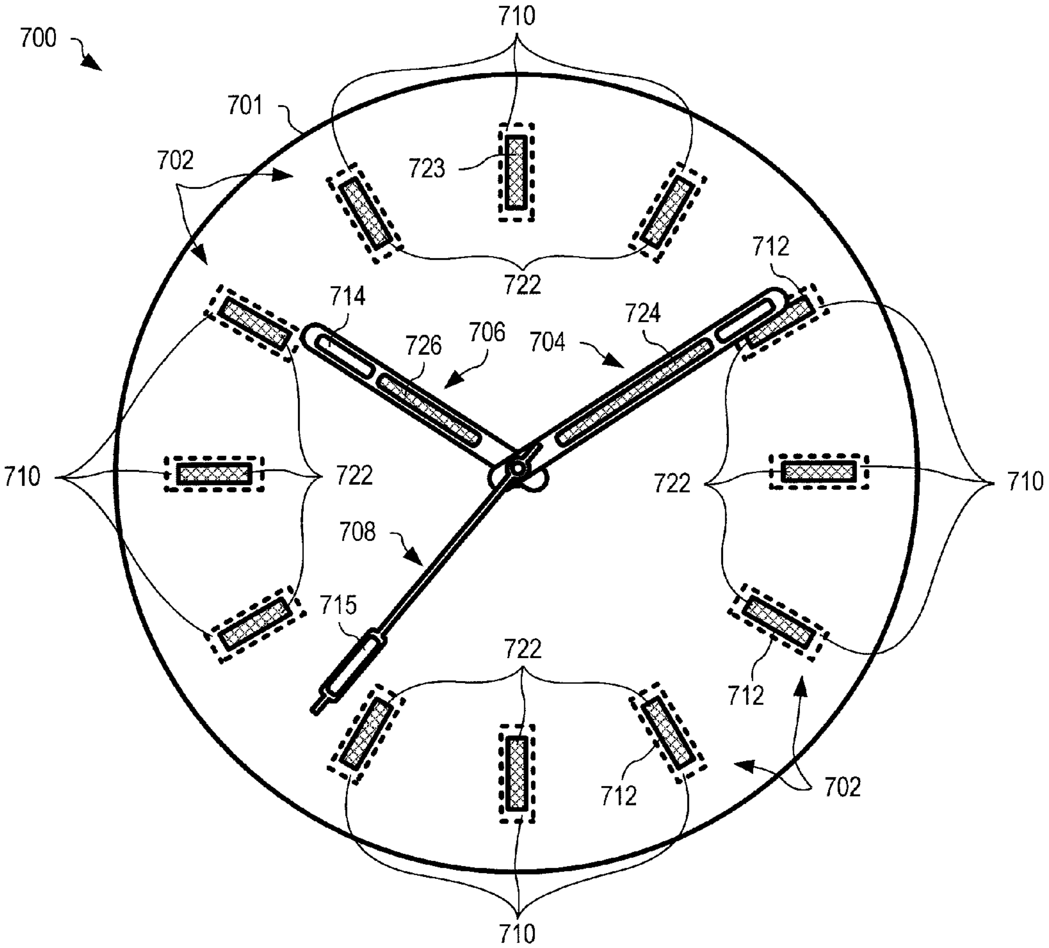
FIG. 7 shows a dual illumination watch face formed with a dial, a minute hand, an hour hand and a second hand, in accord with an embodiment.

FIG. 7 shows a dual illumination watch face 700 formed with a dial 701, a minute hand 704, an hour hand 706 and a second hand 708. Minute hand 704, hour hand 706 and second hand 708 are similar to minute hand 104, hour hand 106, and second hand 108 of FIG. 1. Dial 701 is formed with twelve radially oriented slots 712 for mounting tritium gas tubes 722 and 723. Tube 723 may emit a different color light than tubes 722, to distinguish the twelfth hour marking of dial 701. Phosphorescent material 710 is formed around each of these slots, as shown. Tritium gas tubes 722 and 723 are inserted into the front of these slots and fixed in place from behind using a tape. Watch face 700 thus identifies each hour position 702 on dial 701 with both phosphorescent materials 714, 715, and tritium gas tubes 724, 726.

Figure 7A:
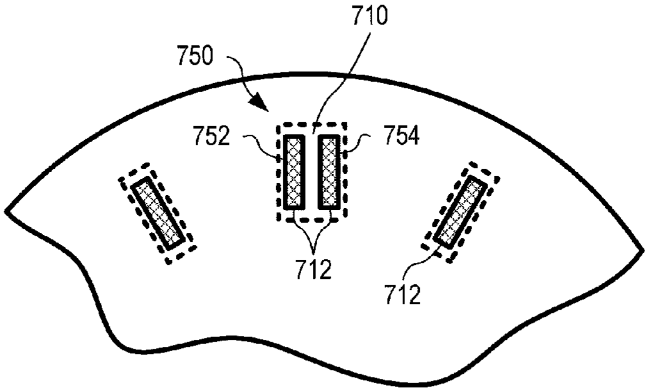
FIG. 7A shows a partial watch face with two tritium gas tubes at the twelfth hour location.

In an alternate embodiment, shown partially in FIG. 7A, the twelfth hour marking 750 is formed with two parallel slots 712 such that two tritium gas tubes 752, 754 may be inserted for easy orientation of watch face 700 in dark conditions.

Figure 8:
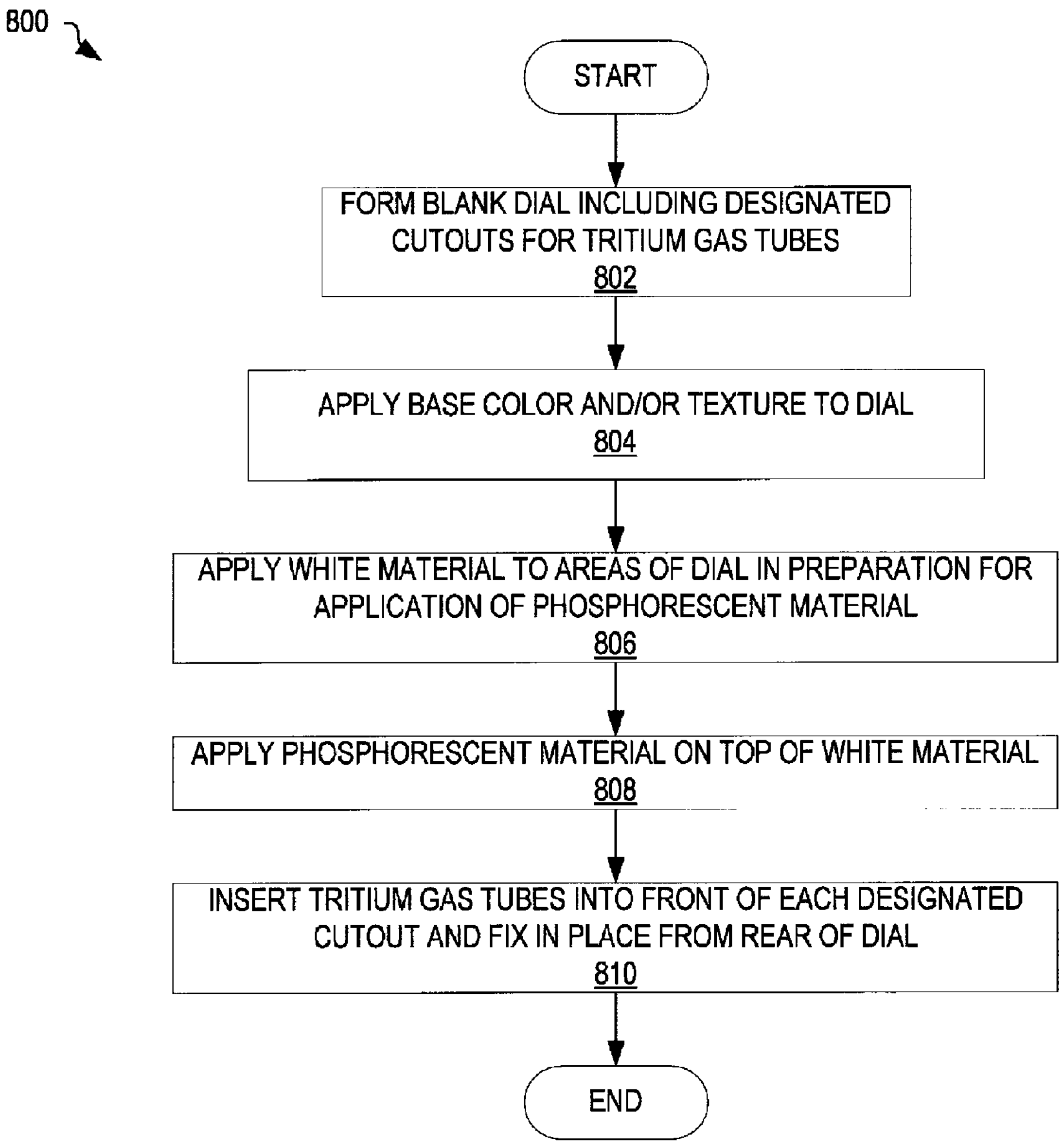
FIG. 8 is a flowchart illustrating one exemplary process for manufacturing a dial with dual illumination.

FIG. 8 is a flowchart illustrating one exemplary process 800 for manufacturing a dial with dual illumination. Process 800 may be used to manufacture dial 101 of FIG. 1. In step 802, process 800 forms a blank dial including designated cutouts for tritium gas tubes. In one example of step 802, a blank dial is stamped out of a copper sheet and includes cutouts 504, 506, 508 and 510. In step 804, process 800 applies a base color and/or texture to areas of the dial not to be coated in phosphorescent material. In one example of step 804, surface 503 of dial 101, FIG. 5, excluding areas 514, is coated in a black paint. In step 806, process 800 applies a white material to areas of the dial 101 in preparation for application of a phosphorescent material. In one example of step 806, a white material is applied to areas 514 of dial 101 using a masking and spray process. In step 808, process 800 applies the phosphorescent material on top of the white material applied in step 806. In one example of step 808, phosphorescent material 110 is applied over the white material on areas 514 of dial 101. Step 808 may be repeated, after the phosphorescent material has cured, to increase the thickness of the phosphorescent material. In step 810, process 800 inserts tritium gas tubes to the front of each designated cutout and fixes each tritium gas tube in place from the rear of the dial. In one example of step 810, the partially formed dial of step 808 is fitted with tritium gas tubes 116, 118, 120 and 122. Tritium gas tubes 116, 118, 120 and 122 are inserted into the front of slots 504, 506, 508 and 510, respectively, and fixed in place by application of a tape to the rear of dial 101.

Figure 9:
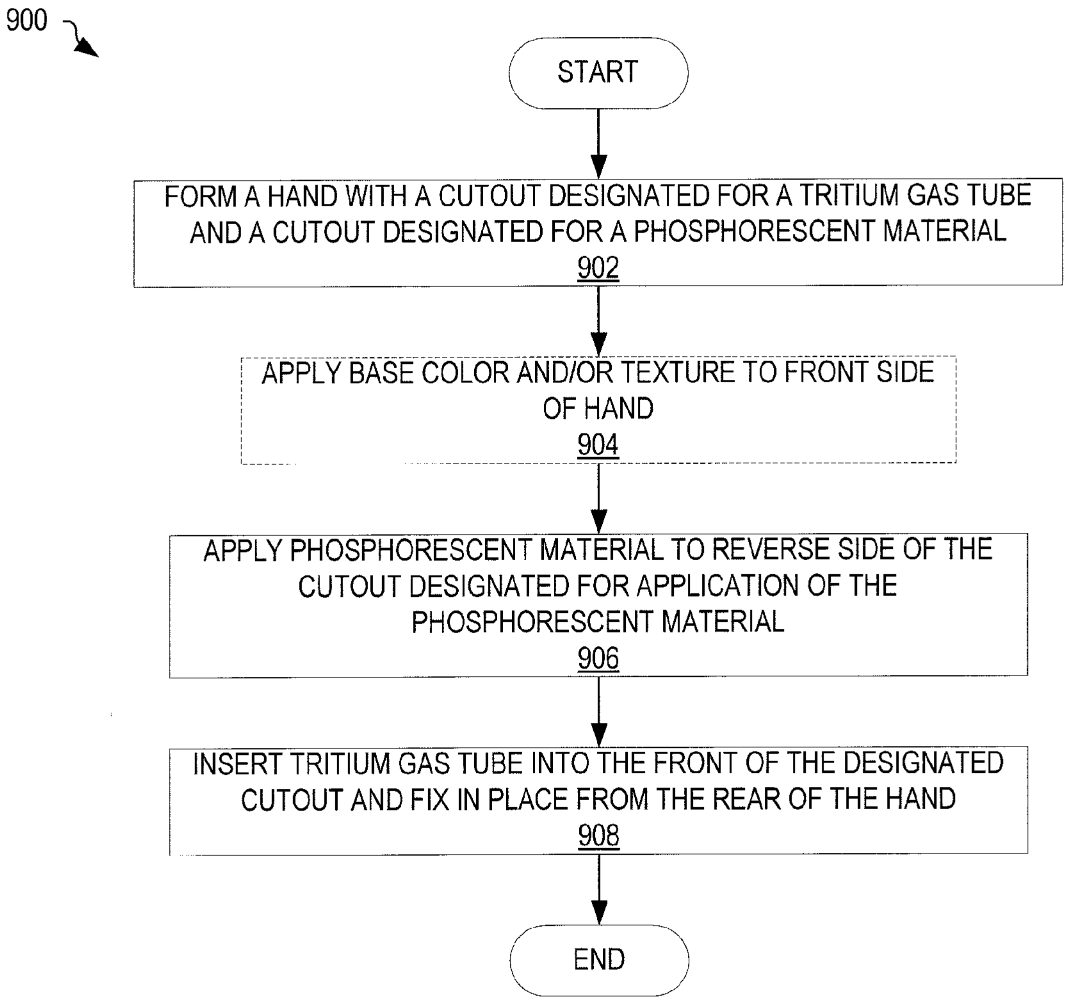
FIG. 9 is a flowchart illustrating one exemplary process for manufacturing watch hands with dual illumination.

FIG. 9 is a flowchart illustrating one exemplary process 900 for manufacturing hands with dual illumination. Process 900 may be used to manufacture minute and hour hands 104, 106 of FIG. 1. In step 902, process 900 forms hands to include cutouts designated for tritium gas tubes and cutouts designated for phosphorescent material. In one example of step 902, hands 104 and 106 of watch face 100 are stamped out of a sheet of metal (e.g., a copper sheet) and include cutouts 310 and 316 designated for phosphorescent material 112 and 114, and cutouts 312 and 318 designated for tritium gas tubes 124 and 126, respectively. Step 904 is optional. In step 904, process 900 applies a base color and/or texture to the front side of each hand formed in step 902. In one example of step 904, a metallic color is applied to front surfaces 305, 307 of hands 104, 106, respectively. In step 906, process 900 applies a phosphorescent material to the reverse side of the cutouts designated for application of the phosphorescent material (in step 902). In one example of step 906, phosphorescent material 112, 114 is applied to the rear of cutouts 310, 316, such that light emitted by phosphorescent material is visible from the front side of hands 104, 106 through cutouts 310, 316, respectively. In step 908, process 900 inserts a tritium gas tube into the front of the designated cutout and fixes the tritium gas tube in place from the rear of the hand. In one example of step 908, tritium gas tubes 124, 126 are inserted into the front of cutouts 312, 318 and fixed in place by application of a tape to the rear of hands 104 and 106, respectively. Partially formed hands of step 908 are then fitted with tritium gas tubes 124 and 126.

As appreciated by one skilled in the art, the weight and balance of hands 104, 106 and 108 must be maintained within specifications required by the utilized movement. Thus, as shown in the examples of FIGS. 1, 3 and 7, second hands 108, 708 do not include a tritium gas tube to allow the use of a movement with less torque, reduced size and lower battery use. However, second hands 108, 708 may also be manufactured with tritium gas tubes so long as a more powerful movement is used.

The color and luminosity of the phosphorescent material may be selected to balance the luminous appearance of the dual illumination watch face. For example, where the tritium gas tubes emit a green light, a matching color may be selected for the phosphorescent material. Similarly, the luminosity of the phosphorescent material may be selected, by adjusting the balance of materials used to make the phosphorescent material, such that the dual illumination watch face is aesthetically pleasing to the human eye under all anticipated operating conditions.

Figure 10:
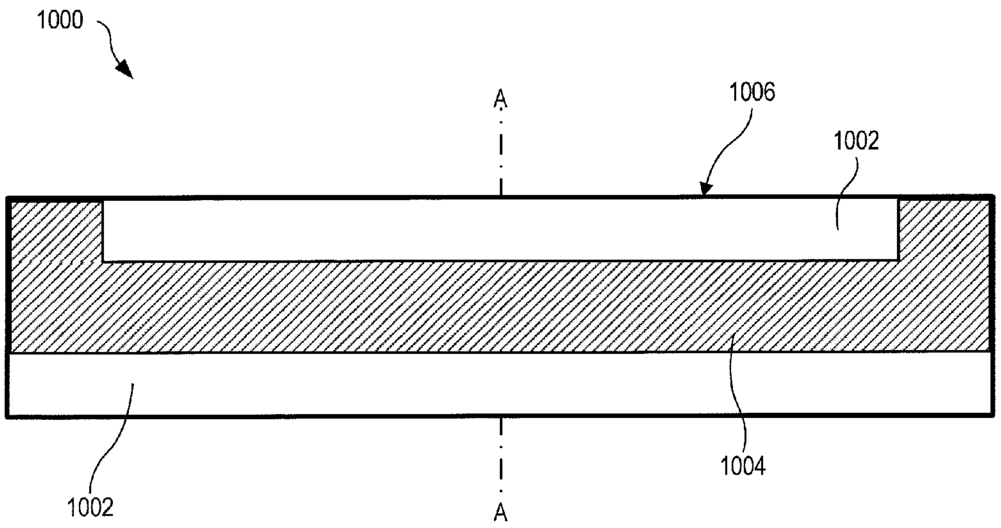
FIG. 10 shows a side view of a tritium gas tube partially coated by an externally-applied phosphorescent material, in accord with an embodiment.

FIG. 10 shows a side view 1000 of a tritium gas tube 1002 partially coated by an externally applied phosphorescent material 1004. In one embodiment, phosphorescent material 1004 is applied to an exterior surface 1003 (see FIG. 11) of tritium gas tube 1002 prior to coupling tritium gas tube 1002 with one of dial 101 and hands 104, 106 (e.g., at one of respective cutouts 116, 118, 120 and 122, or 124 or 126). Where a high torque movement is employed, tritium gas tube 1002 may also be fitted to second hand 108. Since phosphorescent material 1004 is applied to tritium gas tube 1002, phosphorescent material may not be applied to dial 101 and hands 104, 106, 108.

In particular, phosphorescent material 1004 is applied to exterior surface 1003 of tritium gas tube 1002 such that a central window 1006 remains clear of phosphorescent material 1004; light radiated by tritium gas tube 1002 is thus emitted through window 1006.

FIG. 11 shows a cross-section 1100 through tritium gas tube 1002 and phosphorescent material 1004 of FIG. 10 at line A-A. Cross-section 1100 shows phosphorescent material 1004 applied to the sides of tritium gas tube 1002 leaving window 1006 uncovered. An area 1110 also remains clear of phosphorescent material 1004 since this area is covered when tritium gas tube 1002 is coupled with one of dial 101 and hands 104, 106, 108, shown as dotted outline 1104. Area 1110 is thus an under side of tritium gas tube 1002 that may be used to affix tritium gas tube 1002 within a dual illumination watch face (e.g., dual illumination watch face 100, FIG. 1). As shown in FIG. 11, light is emitted from tritium gas tube 1002 through window 1006 as shown by arrows 1108, and light is emitted by phosphorescent material 1004 as shown by arrows 1106.

Figure 12:
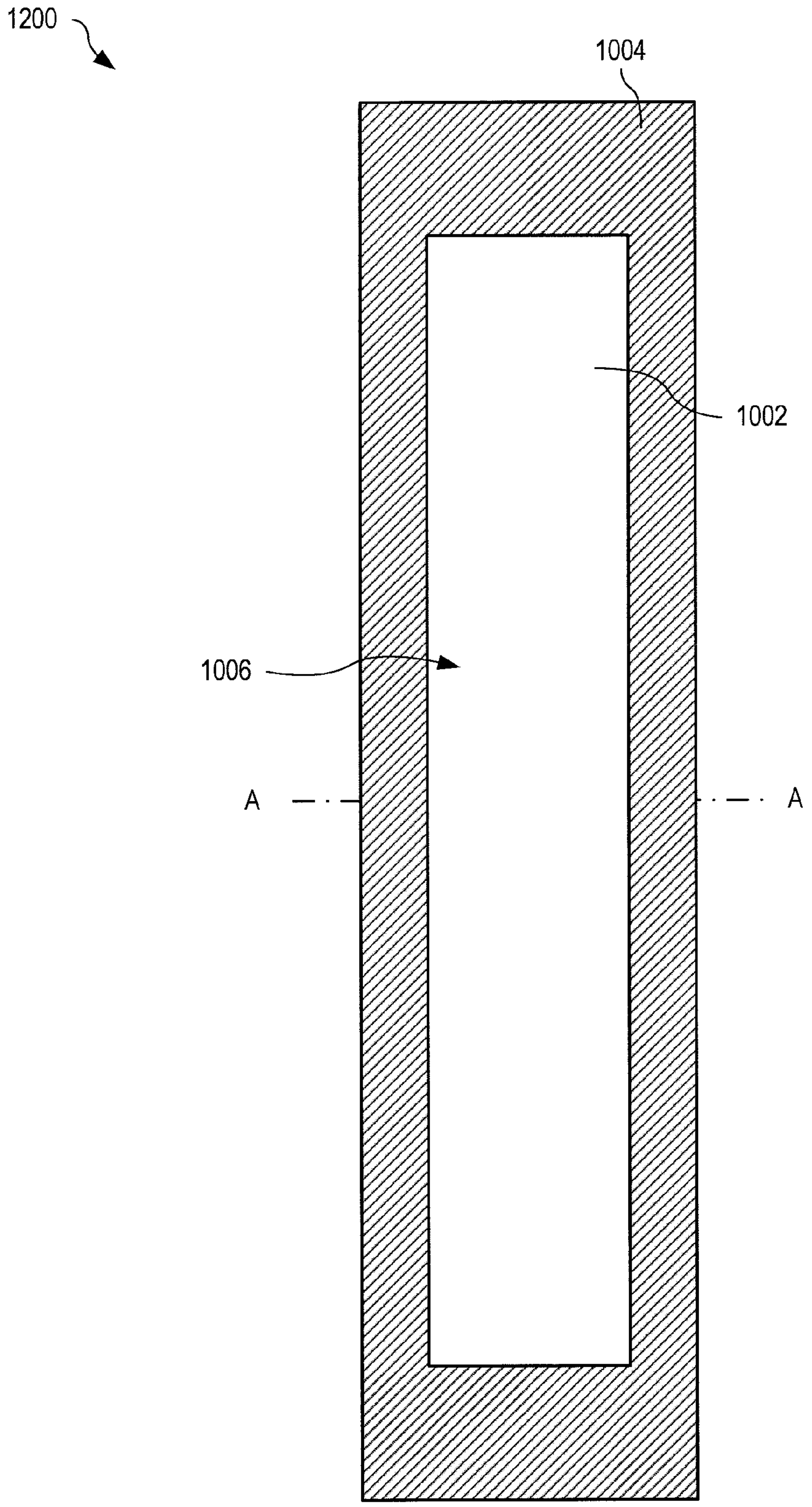
FIG. 12 shows a top view of the tritium gas tube and phosphorescent material of FIG. 10.

FIG. 12 shows a top view 1200 of tritium gas tube 1002 and phosphorescent material 1004 of FIG. 10. The ratio between visible areas of phosphorescent material 1004 and window 1006 may be varied without departing from the scope hereof. For example, by making the area of phosphorescent material 1004 smaller, more light emitted from tritium gas tube 1002 may be visible through a larger window 1006.

Figure 13:
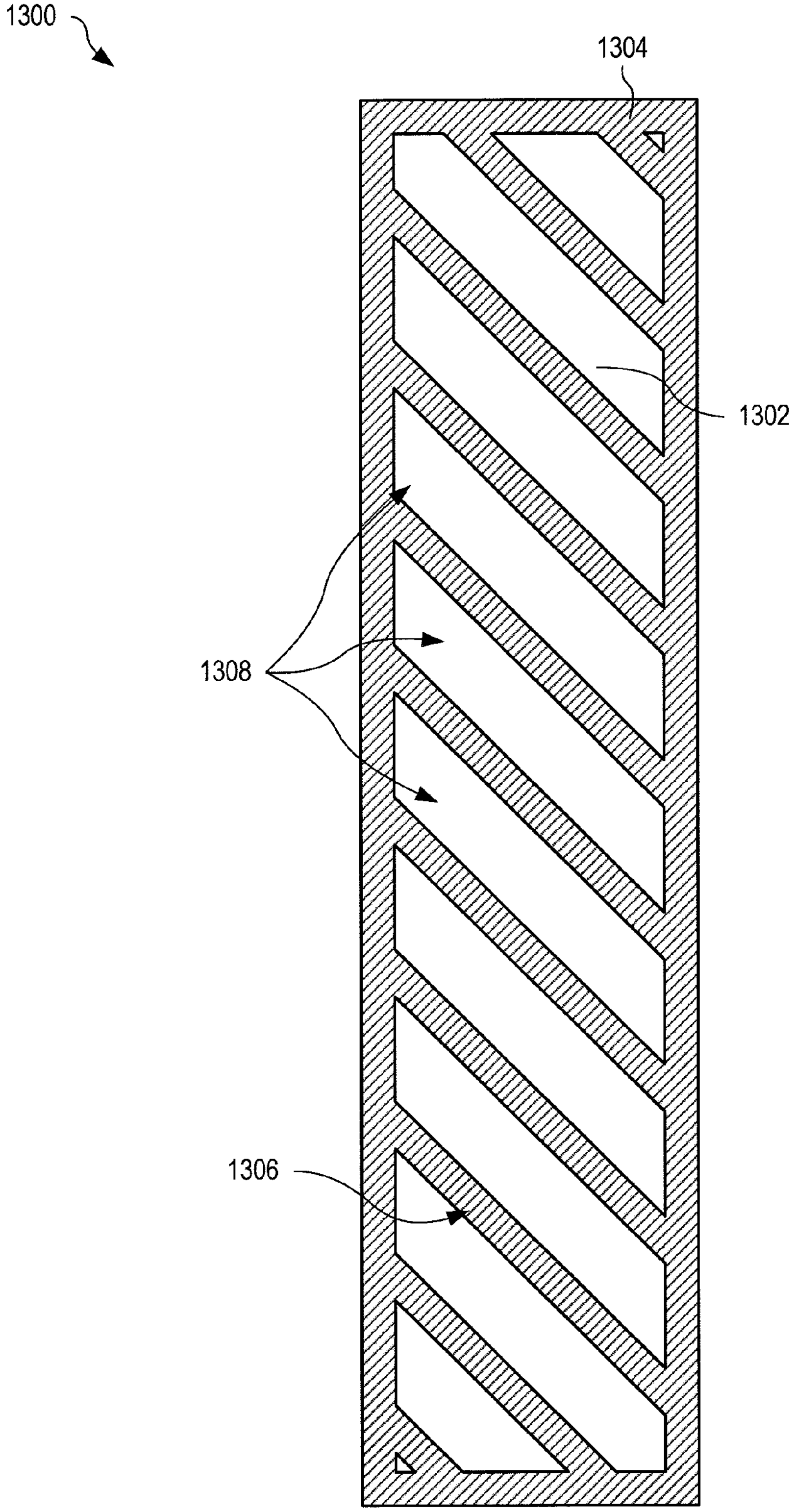
FIG. 13 shows a top view of a tritium gas tube with a phosphorescent material applied to an exterior surface of the tube in a pattern, according to an embodiment.

FIG. 13 shows a top view 1300 of a tritium gas tube 1302 with an externally-applied phosphorescent material 1304. In particular, phosphorescent material 1304 is applied in stripes (or bands) 1306 across an exterior surface of tritium gas tube 1302 to leave a plurality of windows 1308. The number, width and thickness of stripes 1306 may be varied to change the ratio between the area of phosphorescent material 1304 and the area of windows 1308. As appreciated, other patterns of phosphorescent material 1304 may be applied to tritium gas tube 1302 without departing from the scope hereof.

The ratio between the visible area of phosphorescent material and the visible area of tritium gas tubes is selected to provide optimal luminosity of dual illumination watch face 100, FIG. 1. For example, this ratio together with the thickness of applied phosphorescent material may be selected such that the intensity of light output by dual illumination watch face 100 exceeds and closely follows sensitivity of a human eye when transitioning from a light environment to a dark environment.

Changes may be made in the above methods and systems without departing from the scope hereof. It should thus be noted that the matter contained in the above description or shown in the accompanying drawings should be interpreted as illustrative and not in a limiting sense. For example, the number, color and position of each tritium gas tube may be selected as a matter of design choice. Similarly, the position and areas coated with phosphorescent material may be selected as a matter of design choice. The following claims are intended to cover all generic and specific features described herein, as well as all statements of the scope of the present method and system, which, as a matter of language, might be said to fall there between.

What is claimed is:

1. A dual illumination watch face, comprising:

a first tritium gas tube applied to a front of a cutout, and fixed in place from the rear of the cutout, of at least one of a dial, minute hand and hour hand of the watch face; and a first phosphorescent material disposed with at least one of the dial, minute hand and hour hand.

2. The dual illumination watch face of claim 1, further comprising one or more additional second tritium gas tubes each applied to a front of a cutout, and fixed in place from the rear of the cutout, of another of the dial, minute hand and hour hand.

3. The dual illumination watch face of claim 2, the respective first or second tritium gas tube formed with the dial, adjacent to a twelve-hour position of the watch face.

4. The dual illumination watch face of claim 2, the respective first or second tritium gas tube formed with a mid-portion of at least one of the minute hand and the hour hand.

5. The dual illumination watch face of claim 2, a second phosphorescent material disposed with the dial, at one or more hour markings of the watch face.

6. The dual illumination watch face of claim 2, the first phosphorescent material formed with a tip of one or both of the hour hand and the minute hand adjacent the respective tritium gas tube on the one or both of the hour hand and the minute hand, the first phosphorescent material disposed in a longitudinal direction of the respective tritium gas tube and adjacent to an end of the respective tritium gas tube opposite to a center of the watch face.

7. The dual illumination watch face of claim 2, the first or second tube having a constant luminosity and the first phosphorescent material having a time-variable luminosity such that, when viewed by a person in the dark, the phosphorescent material is initially brighter than the gas tube, and the gas tube is later brighter than the phosphorescent material, a ratio between the visible area of the first phosphorescent material and a visible area of the first or second tritium gas tube is selected such that the intensity of light output by the watch face closely follows sensitivity of a human eye when transitioning from a light environment to a dark environment.

8. The dual illumination watch face of claim 2, further comprising a movement selected for normal time-keeping operation based upon a size and weight of one or more of the minute hand, the hour hand and a second hand; the size and weight inclusive of any tritium gas tube or the phosphorescent material configured with the hands.

9. The dual illumination watch face of claim 2, a set of two or more tritium gas tubes being located at one or more hour markings of the dial.

10. The dual illumination watch face of claim 3, the tritium gas tube adjacent to the twelfth hour position having a different color from additional tritium gas tubes mounted with the dial or the hands.

11. The dual illumination watch face of claim 2, further comprising a tape for fixing the tritium gas tube in place.

12. The dual illumination watch face of claim 1, further comprising a white material forming a base for the phosphorescent material upon the dial, minute hand or hour hand, to enhance luminosity of the phosphorescent material.

13. The dual illumination watch face of claim 2, a color and a luminosity of the phosphorescent material being selected based upon a color and a luminosity of the tritium gas tube.

* * * * *